UNITED STATES PATENT OFFICE.

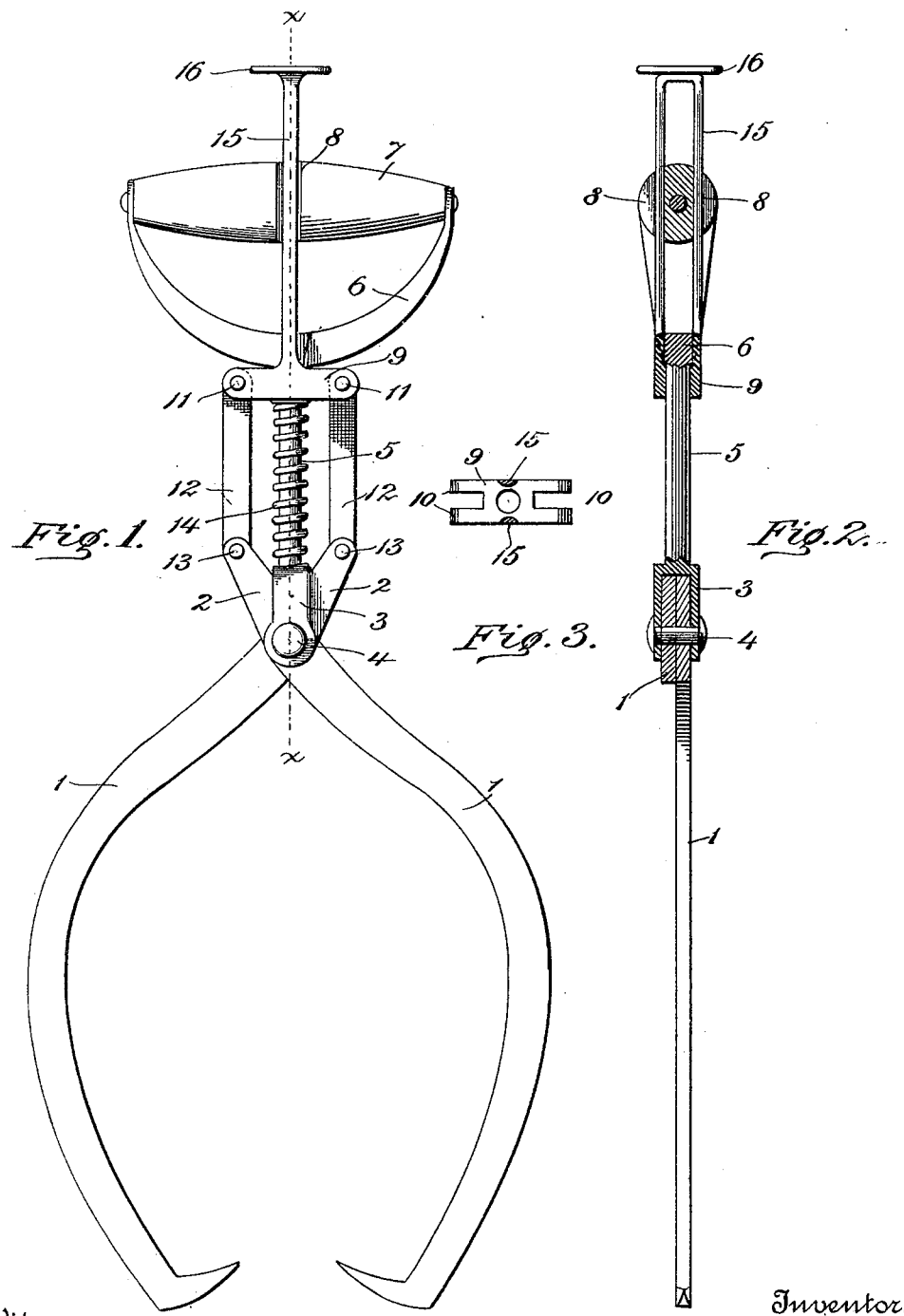

JAMES C. COOK, OF LEWISBURG, PENNSYLVANIA, ASSIGNOR OF TWO-THIRDS TO GEORGE S. FLICK AND W. F. HOFFA, OF SAME PLACE.

ICE-TONGS.

SPECIFICATION forming part of Letters Patent No. 632,176, dated August 29, 1899.

Application filed June 16, 1899. Serial No. 720,774. (No model.)

*To all whom it may concern:*

Be it known that I, JAMES C. COOK, a citizen of the United States, residing at Lewisburg, in the county of Union and State of Pennsylvania, have invented certain new and useful Improvements in Ice-Tongs; and I do hereby declare the following to be a full, clear, and exact description of the invention, such as will enable others skilled in the art to which it appertains to make and use the same.

This invention relates to improvements in ice-tongs, the object in view being to produce a simple and cheap contrivance that is designed to be operated—that is, opened—by one hand of the operator, thus leaving the other hand free to manipulate another similar device or perform other work, and which when released will automatically grapple the block of ice and close thereon.

With these main objects in view and other minor objects hereinafter apparent the invention consists in certain features of construction hereinafter specified, and particularly pointed out in the appended claims.

Referring to the drawings, Figure 1 is an elevation of a pair of ice-tongs embodying my invention, and Fig. 2 is a central longitudinal sectional view of the same on the line $x\,x$ of Fig. 1. Fig. 3 is a detail in plan of the cross-head hereinafter referred to.

Similar numerals of reference designate similar parts in all the figures of the drawings.

In carrying out my invention I employ the two usual tongs members 1 1, the same crossing or intersecting one another a short distance below their upper ends, beyond which point they are extended to form arms 2 2, the lower ends of the tongs members being given the usual and conventional shape. At their intersecting point the two tongs members are loosely embraced by an inverted-U-shaped yoke 3, through the terminals of which and the intersecting tongs members is passed the transverse pivoting bolt or rivet 4. From the upper side of the aforesaid yoke 3 there rises a cylindrical guide post or rod 5, at the upper end of which may be secured rigidly or formed integral the handle-frame 6, carrying a handle 7, preferably formed of wood, and which may be provided at its center and at opposite sides with vertical or transverse guide-grooves 8. A cross-head 9 is mounted on the guide-rod 5 and, as best shown in Fig. 3, is provided with a central hole for the loose reception of said rod 5 and at opposite ends with pairs of lugs or ears 10. Between these opposite pairs of lugs or ears 10 are pivoted, as at 11, the upper ends of a pair of connecting-bars 12, the lower ends of which are pivoted, as at 13, to the upper ends of the arms 2 of the tongs members.

Encircling the guide rod or post 5 and interposed between the upper side of the yoke 3 and the cross-head 9 is a coiled expansion-spring 14, which has a tendency to elevate the cross-head and through the medium of the connecting-bars draw the tongs members to a closed position, and in doing so, therefore, to grapple or grip any object therebetween—as, for instance, a block of ice.

Fastened securely to or formed integral with the opposite sides of the cross-head 9, as is the case in the present instance, is a presser-bail 15, the same extending above the handle 7, and therefore having its opposite sides operating in the guide-grooves 8 thereof. The upper end of this bail is preferably provided with a flat plate 16, against which the palm of the hand of the operator rests when the handle 7 is grasped.

The operation of the device may be briefly described as follows: The handle 7 is grasped by the operator and the hand closed, in which operation the palm of the hand is closed down upon the presser-plate 16, which, in a manner that will at once be obvious, causes the cross-head to descend against the tendency of the spring 14, and through the medium of the connecting-bars 12 causes the tongs members to spread. The tongs being thus opened are introduced over a cake of ice, and when in proper position the operator liberates the presser-head, the spring returning the parts to their normal position, and therefore causing the spurs of the tongs members to engage securely with the ice. To liberate the ice it is simply necessary to repeat the operation.

It will be observed that my invention is very simple and can be manipulated with one hand, thus leaving the other hand free to perform a similar service or any other kind of work.

Having described my invention, what I claim, and desire to secure by Letters Patent, is—

1. The combination with a pair of tongs members pivotally connected between their ends and extended beyond their pivot-point to form extensions or arms, an inverted-U-shaped yoke connected to the pivot and having an upwardly-extended guide-rod terminating in a handle-frame having a handle provided with opposite guide-grooves, and a presser-bail extending upwardly from the cross-head and having its opposite terminals or sides operating in said grooves and terminating above the handle in a presser-head, of connecting-bars pivotally connected to the opposite ends of the cross-head and the upper ends of the arms, and an expansion-spring encircling the guide-rod and interposed between the yoke and cross-head.

2. The combination with a pair of tongs members, and a pivot loosely connecting the same between their ends, of a guide-rod connected at its lower end to the said pivot, a cross-head loosely mounted on the said guide-rod, connecting-bars loosely connected to the ends of the same and to the ends of the tongs members above their pivot-point, a handle at the upper end of the guide-rod above the cross-head, a spring for normally raising the cross-head, and a depressing device connected to the cross-head and extending above said handle.

In testimony whereof I affix my signature in the presence of two witnesses.

JAMES C. COOK.

Witnesses:
  WM. R. FOLLMER,
  JOHN P. RUHL.